United States Patent [19]

Herron et al.

[11] Patent Number: 4,504,992
[45] Date of Patent: Mar. 19, 1985

[54] HOSPITAL BED TELEPHONE HOLDER

[76] Inventors: Robert G. Herron; Claudia S. Herron, both of 628 George St., Old Forge, Pa. 18518

[21] Appl. No.: 447,241

[22] Filed: Dec. 6, 1982

[51] Int. Cl.³ .................... H04M 1/04; A47B 97/00; A47B 96/06
[52] U.S. Cl. .................... 5/507; 179/146 R; 248/215
[58] Field of Search ............. 5/503, 507, 508, 425; 108/49; 248/215; 179/146 R, 147, 154

[56] References Cited

U.S. PATENT DOCUMENTS

| | | | |
|---|---|---|---|
| 3,009,676 | 11/1961 | Buchwald | 5/507 |
| 3,340,826 | 9/1967 | Jenssen | 5/507 |
| 4,203,175 | 5/1980 | Heine | 248/215 |
| 4,431,154 | 2/1984 | Hamm | 248/215 |
| 4,432,522 | 2/1984 | Pruente et al. | 5/503 |

*Primary Examiner*—Alexander Grosz
*Attorney, Agent, or Firm*—Harvey B. Jacobson

[57] ABSTRACT

A first upstanding panel section is provided including inner and outer sides and terminating upwardly in an inwardly and downwardly directed first reversely turned hook portion for engagement over the upper horizontal rail portion of a hospital bedside rail assembly with the inner side of the panel section abuttingly engaging the outer side of the rail assembly at points spaced vertically along the first panel section. The lower end of the first panel section terminates downwardly in an outwardly and upwardly directed second reversely turned panel section spaced slightly outwardly of the outer side of the first panel section. The second panel section terminates upwardly in an outturned horizontally directed shelf spaced below the upper end of the first panel section and the shelf terminates outwardly in an upturned curb. The base of a telephone may be positioned on the shelf between the curb and the upper end of the first panel section and the first panel section, the second panel section and the shelf are integrally formed from a single piece of stiff plastic material or the like with the reversely turned portion connecting the lower ends of the first and second panel sections being resilient to the extent that a telephone base supported upon the shelf may be clamped between the curb and the upper marginal portion of the first panel section.

7 Claims, 3 Drawing Figures

HOSPITAL BED TELEPHONE HOLDER

BACKGROUND OF THE INVENTION

There are many instances in which a bed patient in a hospital bed must have the side rail sections of the bed maintained in elevated positions. Although some of these patients are able to use and may benefit mentally and phsychologically from use of a telephone, many bed patients find it difficult to reach over to a bedside table or cabinet or the like to use a telephone positioned thereon, particularly when they have to reach over an elevated hospital bed side rail assembly. Accordingly, a need exists for structure by which a telephone may be conveniently supported from a hospital bed side rail assembly on the exterior thereof and with the receiver portion of the telephone spaced slightly above the upper marginal edge of the side rail assembly for ease of use by a patient in the bed and without the telephone or its support projecting into the area disposed immediately above the mattress of the bed.

Examples of various different forms of bed mounted supports including some of the general structural and operational features of the instant invention are disclosed in U.S. Pat. Nos. 868,037, 1,866,258, 3,009,676, 3,174,162 and 4,222,136.

BRIEF DESCRIPTION OF THE INVENTION

The telephone holder of the instant invention is constructed in a manner whereby it may be readily supported from the upper portion of a hospital bed side rail assembly, whether the bed side rail assembly is elevated or lowered, and in a manner such that the base of a telephone may be supported therefrom against shifting relative thereto. In addition, the holder is constructed in a manner whereby the receiver portion of the telephone supported therefrom will be disposed at an elevation projecting at least slightly above the upper rail of the bed side rail assembly thereby enabling easy access to the receiver portion of the telephone whether the side rail assembly is in a lowered position or in an elevated position.

The main object of this invention is to provide a telephone support for use on a vertically raisable and lowerable hospital bed side rail assembly.

Another object of this invention is to provide a telephone support or holder in accordance with the preceding object and which is capable of supporting the base of a telephone therefrom in stationary position against shifting relative to the holder or the bed.

Yet another object of this invention is to provide a telephone holder which may be readily removably supported from an associated hospital bed side rail assembly.

A still further object of this invention is to provide a telephone holder including structure by which the base of the supported telephone may be frictionally gripped and retained in position on the holder.

A final object of this invention to be specifically enumerated herein is to provide a hospital bed telephone holder constructed in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
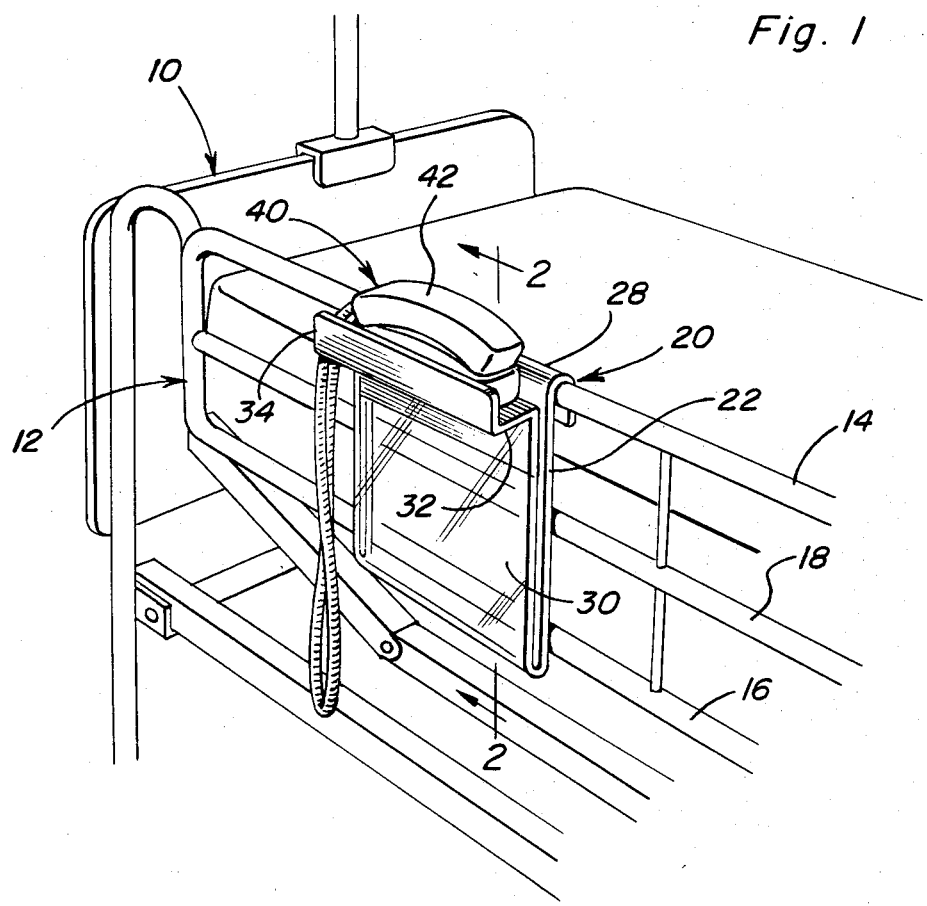
FIG. 1 is a fragmentary perspective view of a typical form of hospital bed with the near side rail assembly thereof in elevated position and with the telephone holder of the instant invention operatively supported from the side rail and being utilized to support a telephone therefrom.

Referring now more specifically to the drawings, the numeral 10 generally designates a conventional form of hospital bed including a vertically raisable and lowerable side rail assembly referred to in general by the reference numeral 12. The side rail assembly 12 includes upper and lower horizontal bars 14 and 16 extending longitudinally of the bed as well as an intermediate height bar 18 extending longitudinally of the bed.

The telephone holder of the instant invention is referred to in general by the reference numeral 20 and comprises a one piece structure including a first upstanding panel section 22 having inner and outer sides 24 and 26 and terminating upwardly in an inwardly and downwardly directed first reversely turned hook portion 28. The panel section 22 terminates downwardly in an outwardly and upwardly directed second reversely turned panel section 30 and the second panel section terminates upwardly in a horizontally and outwardly directed shelf portion 32 which in turn terminates outwardly in an upwardly directed curb 34.

Figure 2:
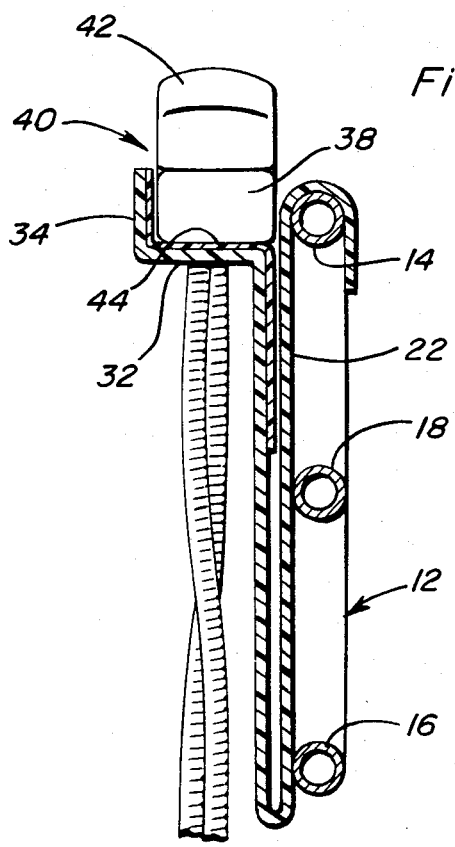
FIG. 2 is an enlarged vertical sectional view taken substantially upon the plane indicated by the section line 2—2 of FIG. 1.
Figure 3:
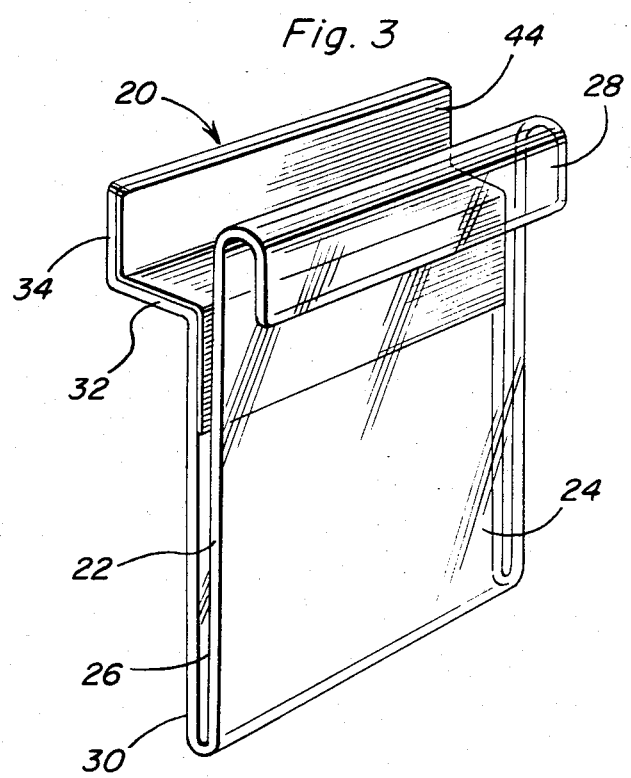
FIG. 3 is a perspective view of the telephone holder.

The holder 20 may be constructed of a single sheet of stiff plastic or similar material formed into the configuration illustrated and with the juncture between the first and second panel sections 22 and 30 being sufficiently resilient whereby the upper end of the second panel section 30 is yieldingly biased toward the upper marginal portion of the first panel section 22. In this manner, the base portion 38 of a telephone 40 may be supported from the shelf portion 32 and clampingly engaged between the curb 34 and the upper marginal edge of the first panel section 22, the upper marginal edge of the second panel section 30 being illustrated slightly biased away from the upper marginal portion of the first panel section 22 in FIG. 2 to illustrate the manner in which the base section 38 of the telephone 40 may be clamped between the curb 34 and the upper marginal edge of the first panel section 22. In addition, a flexible panel 44 of non-slip material may be secured to the inner side of the curb 34, the upper surface of the shelf portion 32 and extend downwardly along the inner side of the second panel section 30 in the manner illustrated in FIG. 2 of the drawings whereby the holder 20 may exert a non-slip gripping action on the base section 38 of the telephone 40. On the other hand, the panel 44 may be replaced by a non-slip resilient coating, if desired.

The width of the shelf portion 32 may vary according to the width of the base section 38 of the telephone 40 to be used in conjunction therewith and it will be noted that the holder 20 supports the receiver section 42 of the telephone 40 in slightly elevated position relative to the upper rail 14 of the hospital bed side rail assembly 12. Of course, inasmuch as the holder 20 is supported from the rail assembly 12, it is adjusted up and down with the rail assembly as the latter is raised and lowered.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A phone holder for a hospital bed, said holder comprising a one-piece panel structure including a first upstanding panel section including inner and outer sides and terminating upwardly in an inwardly and downwardly directed first reversely turned hook portion adapted to hook engage over the upper horizontal rail portion of a hospital bed side rail assembly with said inner side abuttingly engaging the outer side of said rail assembly at points spaced vertically therealong said first panel section, the lower end of said first panel section terminating downwardly in an outwardly and upwardly directed second reversely turned panel section spaced slightly outwardly of the outer side of the first panel section, said second panel section terminating upwardly in an out-turned horizontally directed shelf spaced below the upper end of said first panel section, said shelf being adapted to support the base of a telephone between said curb and said upper end of said first panel section, the upper marginal portion of said second panel section and said shelf and curb being yieldingly biased toward the upper marginal portion of the first upstanding panel section for clampingly engaging a telephone base disposed on said shelf between said curb and the upper marginal edge of said first panel section.

2. The telephone holder of claim 1 wherein said telephone holder is constructed of rigid plastic.

3. The telephone holder of claim 2 wherein said plastic is transparent.

4. In combination with a hospital bed including a vertically adjustable side rail assembly having upper and lower horizontal rails exteding longitudinally of the bed, a phone holder comprising a one-piece, stiff and resilient panel structure including a first upstanding panel section having inner and outer sides and terminating upwardly in an inwardly and downwardly directed inversely turned hook portion hook engaged over the upper horizontal rail of said side rail assembly with said first panel section disposed on the outer side of said side rail assembly and abuttingly engaged with the outer sides of said upper and lower rails, the lower end of said first panel section terminating downwardly in an outwardly and upwardly directed second reversely turned panel section spaced slightly outwardly of the outer side of said first panel section, said second panel section terminating upwardly in an out-turned horizontally directed shelf spaced below the upper end of said first panel section, said shelf terminating outwardly in an upturned curb, and a telephone assembly having its base supported on said shelf with said base clamp engaged between said curb and the upper marginal portion of said first panel section, the resiliency of said panel structure serving to yielding bias the upper marginal portion of said second panel section and said shelf and curb toward the upper marginal portion of the first upstanding panel section.

5. The telephone holder of claim 4 wherein said telephone holder is constructed of rigid plastic.

6. The telephone holder of claim 5 wherein said plastic is transparent.

7. The telephone holder of claim 6 wherein the inner side of curb and the upper side of said shelf are provided with a non-slip coating.

* * * * *